United States Patent [19]

Fassbender

[11] Patent Number: 5,221,486

[45] Date of Patent: * Jun. 22, 1993

[54] AQUEOUS PHASE REMOVAL OF NITROGEN FROM NITROGEN COMPOUNDS

[75] Inventor: Alex G. Fassbender, West Richland, Wash.

[73] Assignee: Battelle Memorial Institute, Richland, Wash.

[*] Notice: The portion of the term of this patent subsequent to Jun. 2, 2009 has been disclaimed.

[21] Appl. No.: 685,259

[22] Filed: Apr. 12, 1991

[51] Int. Cl.$^5$ .............................. C02F 1/58; C02F 1/02
[52] U.S. Cl. .................................... 210/757; 210/761; 210/766; 210/903; 210/908; 588/220
[58] Field of Search .................... 210/757–763, 210/766, 903, 908, 909, 743; 252/626; 423/DIG. 20

[56] References Cited

U.S. PATENT DOCUMENTS

| | | | |
|---|---|---|---|
| 4,268,397 | 5/1981 | Horie et al. | 210/759 |
| 4,280,914 | 7/1981 | Knorre et al. | 210/759 |
| 4,294,706 | 10/1981 | Kakihara et al. | 210/762 |
| 4,439,326 | 3/1984 | Heilgeist | 210/757 |
| 4,654,149 | 3/1987 | Harada et al. | 210/763 |
| 4,680,169 | 7/1987 | Morgan | 210/758 |
| 4,990,266 | 2/1991 | Vorlop et al. | 210/757 |
| 5,011,614 | 4/1991 | Gresser et al. | 210/761 |
| 5,082,573 | 1/1992 | Goldstein et al. | 210/757 |
| 5,096,599 | 3/1992 | Granelli | 210/766 |
| 5,118,447 | 6/1992 | Cox et al. | 210/761 |

Primary Examiner—Thomas Wyse
Attorney, Agent, or Firm—Paul W. Zimmerman

[57] ABSTRACT

A method is disclosed for denitrification of compounds containing nitrogen present in aqueous waste streams. The method comprises the steps of (1) identifying the types of nitrogen compounds present in a waste stream, (2) determining the concentrations of nitrogen compounds, (3) balancing oxidized and reduced form of nitrogen by adding a reactant, and (4) heating the mixture to a predetermined reaction temperature from about 300° C. to about 600° C., thereby resulting in less harmful nitrogen and oxygen gas, hydroxides, alcohols, and hydrocarbons.

49 Claims, No Drawings

AQUEOUS PHASE REMOVAL OF NITROGEN FROM NITROGEN COMPOUNDS

FIELD OF THE INVENTION

The present invention relates to a method of denitrification of compounds containing nitrogen including nitrates, ammonia, nitro-organic compounds, amides and amines. Such compounds are found in aqueous waste streams of sewage treatment and metal finishing plants and treatment by this method results in less harmful nitrogen gas, oxygen gas, hydroxides, alcohols, and hydrocarbons.

As used herein, the term aqueous is used to mean of, relating to or resembling water, in a liquid or a supercritical phase.

BACKGROUND OF THE INVENTION

Compounds containing nitrogen including but not limited to nitrates, nitrites, nitro-organic compounds, ammonia, amines, and amides are often present together in various combinations in non-radioactive aqueous mixed waste streams such as sewage, sewage sludge, nitrate or nitrite wastes at metal finishing plants, and chemical and munitions plants. Nuclear materials production facilities also generate waste streams containing both nitrogen bearing compounds and radioactive materials.

In many waste or process streams, the concentration of nitrogen compounds is below 1% which is insufficient for cost effective removal of nitrogen compounds by traditional means. Removal of nitrogen from nitrogen bearing streams of higher concentration may be precluded by the presence of hazardous chemicals and/or radioactivity. Moreover, nitrogen compounds at any concentration in a waste stream, present problems such as nitrous oxide ($NO_x$) emission upon disposal by incineration, and algae bloom induced eutrophication upon disposal by drainage into bodies of water.

Of the many methods of denitrification, very few are effective for anything other than a single nitrogen containing compound For example, The Nalco Water Handbook, 1979, pp. 6–11, states that "[t]he only chemical process that removes nitrate is anion exchange". However, the anion exchange process suffers from a number of disadvantages including 1) other nitrogen compounds are unaffected by the anion exchange, 2) additional chemicals are required to regenerate the anion exchange resin and 3) additional chemicals are required to regenerate the anion exchange resin and a waste stream is produced upon resin regeneration.

Further examples of single nitrogen compound removal include methods of ammonia removal The Handbook (pp. 6–10) also states that "[a]mmonia can be removed by degasification, by cation exchange on the hydrogen cycle, and by adsorption on certain clays, such as clinoptilolite". The disadvantage of these processes is that since they are primarily directed toward removal of ammonia, other compounds containing nitrogen are generally unaffected. A further disadvantage of these processes is that the pH of the waste stream must be raised to increase the vapor pressure of aqueous ammonia.

Another method of ammonia removal is by addition of chlorine to form nitrogen gas and hydrochloric acid. For purposes of toxic waste remediation, it is undesirable to handle chlorine or produce hydrochloric acid, and not all nitrogen compounds will release nitrogen gas upon addition of chlorine.

Hydrazine ($N_2H_4$), may be removed by reaction with dissolved oxygen to produce nitrogen gas and water. However, any other nitrogen compounds that may be present remain unaffected by this reaction.

Each of the denitrification processes described so far are effective for removing one type of nitrogen compound. Removal of multiple nitrogen compounds by these methods requires use of multiple methods.

There are currently two methods capable of removing multiple nitrogen compounds, bacterial processing and incineration. Conventional bacterial systems usually require a settling pond or biological reactor, are carried out at temperatures below 30° C., require equipment to handle great quantities of air and require residence times on the order of days to reduce nitrogen compound concentrations below acceptable limits.

In cases where nitrogen bearing waste streams are incinerated, undesirable nitrous oxide ($NO_x$) emissions, components of smog, are produced. $NO_x$ can be combined with ammonia and destroyed by gas phase reactions at temperatures between 1000° C. and 1100° C. (known as thermal deNOx) or by selective catalytic reduction, at temperatures between 650° C. and 750° C. in the presence of a catalyst to convert the $NO_x$ to nitrogen, oxygen, and water. Disadvantages of treating nitrous oxides in the gas phase include, but are not limited to, 1) the size of the equipment required for handling gases, 2) the high temperature operation, 3) handling potentially corrosive condensate after the gas stream is cooled and 4) the cost of disposal of a spent catalyst after processing radioactive wastes.

Nitrogen compounds may be converted to a second nitrogen compound, but this does not fully remove nitrogen compounds. For example, cases where waste streams have a high chemical oxygen demand (COD) from the presence of carbonaceous and nitrogenous compounds, wet air oxidation can be used to oxidize most or all of the carbon portion of the waste. J. R. Heimbuch and A. R. Wilhelmi stated in their publication "Wet Air Oxidation—A Treatment Means for Aqueous Hazardous Waste Streams", December, 1985, Journal of Hazardous Materials, page 192: "A significant advantage of wet air oxidation is that there are minimal air pollution problems. Contaminants tend to stay in the aqueous phase. The small amount of gas that is discharged consists mainly of spent air and carbon dioxide. NOx emissions are not observed because nitrogen compounds are converted to ammonia." Thus, while wet air oxidation is effective for destroying the carbonaceous portion of the waste and converting the nitrogenous portion to ammonia, wet air oxidation as currently practiced, does not remove the nitrogen in the ammonia present in the aqueous stream.

In cases of waste streams having a plurality of nitrogen compounds, removal of nitrogen is a difficult and expensive task. Prior to the instant invention, only bacterial action and incineration were capable of removing a plurality of nitrogen compounds from an aqueous waste stream. However, neither of these approaches have nitrogen gas as the predominant nitrogenous end product and both of these approaches suffer from the previously mentioned disadvantages, especially when radioactive waste streams are considered.

The present invention is therefore, directed toward a method of removing a plurality of nitrogen containing compounds from an aqueous waste stream resulting in release of nitrogen as nitrogen gas without formation of nitrous oxides such as NO, $NO_2$ and $N_2O_4$. The method of the present invention relies upon aqueous phase reactions at moderate temperatures and pressures without the use of a catalyst and without the subsequent regeneration and/or disposal of a catalyst in both non-radioactive and radioactive waste treatment.

SUMMARY OF THE INVENTION

The present invention comprises a method of removing nitrogen by aqueous phase reactions from a plurality of compounds containing nitrogen including but not limited to nitrates, nitrites, ammonia, amides, amines and nitro-organic compounds. Such compounds may be present in non-radioactive and radioactive aqueous waste streams and may be treated with the method of the present invention resulting in less harmful products including nitrogen and oxygen gases, hydroxides, alcohols, and hydrocarbons. The hydroxides may be further reacted with carbon dioxide to produce solid, dry carbonates. Alcohols and hydrocarbons may be separated from the waste stream for future use.

The method of the present invention can be used alone or in combination with existing processes such as wet air oxidation. The combination of processes may be performed in a separate reaction vessel or may be combined in a single, existing reaction vessel. In the latter embodiment, the wet air oxidation may be performed first and then the invention disclosed herein applied.

The method of the present invention comprises the steps of identifying the type and concentration of compounds containing nitrogen in the waste stream, balancing the oxidized and reduced forms of nitrogen by adding an appropriate nitrogen containing reactant such as ammonia or a nitrite or nitrate compound, and heating the mixture under pressure to obtain the desired reaction.

Balancing, accomplished by adding a nitrogen compound such as nitric acid to a waste stream containing ammonia and amines, will produce water and nitrogen and oxygen gases. The addition of a nitrite salt produces similar products but with less oxygen gas.

Heating is required to overcome the activation energy of reactions between the balanced nitrogen compounds. Heating may be done before or after the balancing step. The balanced and heated mixture is maintained under pressure and held at these conditions for sufficient time to allow reactions to go to completion. The method can be expanded to include further processing of the remaining aqueous products.

The advantages of the process of the present invention include 1) removal of nitrogen from a plurality of compounds containing nitrogen in the aqueous phase, 2) reaction products are relatively benign and stable allowing recycling or further processing or disposal by conventional means, 3) reduced reactor volume as compared with bacterial treatment or gas phase treatment of nitrous oxides, 4) lower temperature operation as compared with gas phase treatment, 5) faster treatment as compared with bacterial treatment, and 6) no catalyst is required.

The subject matter of the present invention is particularly pointed out and distinctly claimed in the concluding portion of this specification. However, both the organization and method of operation, together with further advantages and objects thereof, may best be understood by reference to the following detailed description of the preferred embodiment.

DESCRIPTION OF THE PREFERRED EMBODIMENT

In the preferred process, nitrogen compounds present in a waste stream such as sewage, metal finishing nitrate wastes, and radioactive nitrate wastes, are identified and their concentrations determined. Identification and determination of concentrations of the nitrogen compounds may comprise one or a combination of 1) assessment of prior streams and deduction of composition, 2) evaporation and X-ray analysis, 3) direct electrode measurement, 4) the Kjeldahl method and variants thereof, 5) infrared, visible and ultraviolet spectrometry, 6) gas chromatography, 7) mass spectrometry, 8) chemical oxygen demand determination and 9) other standard laboratory techniques as required and conventionally practiced. When reactants from the group including, but not limited to, nitrate salts, nitrite salts, nitric acid, ammonium salts and ammonia are added to a nitrogen-containing waste stream, and the mixture heated to a predetermined lowest reaction temperature, under sufficient pressure to maintain an aqueous phase, and held at these conditions for a predetermined time nitrogen is removed as nitrogen gas. The order of the balancing and heating steps may be reversed to allow heating first, then balancing. In addition to the reactants, pH modifiers such as mineral acids, carbon dioxide or organic acids may be used to lower the pH and thereby increase the yield of nitrogen gas.

Reactions used for denitrification include but are not limited to the following reaction equations. In the following reactions, M is the symbol for a water soluble cation, X is a water soluble anion, and R is a covalently bound organic chain or ring.

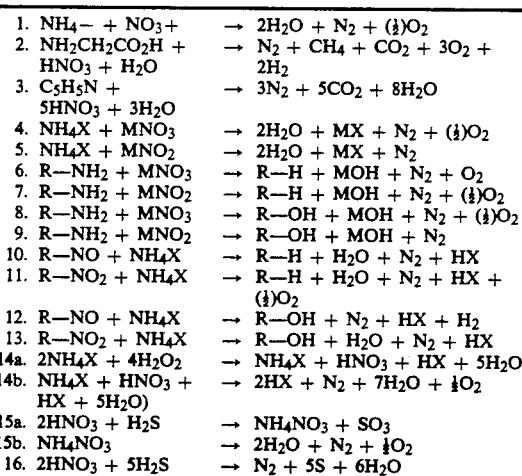

For example, a waste stream having ammonia, ammonium ion, amines, glycine and pyridine can be treated by adding nitric acid resulting in water and gaseous nitrogen and oxygen (Equations 1-4,6, and 8). Addition of sodium nitrite will give the same products but with less oxygen (Equations 5,7, and 9). Balancing R-NO and $R-NO_2$ with $NH_4X$ produces nitrogen gas and leaves hydrocarbon products that can be treated separately (Equations 10-13). Although not shown in the equations amide ions, azo compounds, nitro derivatives and amino acids may be treated by addition of nitric acid, nitrates or nitrites. In a preferred process, a first preselected nitrogen containing compound is added to an aqueous stream having a second plurality of nitrogen containing compounds. The amount of the first preselected nitrogen containing compound is equivalent to the mole fraction of the second plurality of nitrogen containing compounds which can range from TKN (total Kjeldahl nitrogen) detection limits to a saturated solution.

Variations of the basic process are embodied as alternative methods of balancing oxidized and reduced forms of nitrogen. A second embodiment of the present invention comprises balancing the oxidized and reduced forms of nitrogen by adding an appropriate non-nitrogen containing reactant (such as hydrogen, hydrogen sulfide, hydrogen peroxide, or potassium permangenate, Equations 14–16) in an amount substantially equivalent to a half mole fraction of the nitrogen compounds present in the waste stream. The addition of sufficient oxidizing or reducing agent to the waste stream causes a balance in the oxidized and reduced forms of nitrogen compounds and then the desired reactions between the nitrogen compounds will proceed and release nitrogen gas and possibly other components such as oxygen gas and/or water.

In the case where the waste water contains an excess of reduced nitrogen compounds such as amines or ammonia, oxidizing agents such as air, oxygen, hydrogen peroxide or potassium permanganate can be used. Reaction 14 illustrates an embodiment wherein an aqueous waste stream containing an ammonium compound is partially reacted with an oxidant converting some of the ammonium ion to nitrous or nitric acid. Further reaction between the remaining ammonium ion and the newly created nitrous acid results in nitrogen gas, water, oxygen and a hydrogen compound.

Where waste water contains an excess of oxidized nitrogen compounds, such as nitrates or nitrites, hydrogen sulfide can be used as the reducing agent. Reactions 15a, 15b and 16 illustrate an embodiment wherein an aqueous waste stream containing a nitrate compound is partially reacted with a reductant, which may either convert some of the nitrate to ammonium nitrate or to sulfur and nitrogen gas. When ammonium nitrate is produced, it may be further reacted as in reaction 1 to obtain nitrogen and oxygen gases. Whether reactions 15a and b or reaction 16 occurs depends on the amount of hydrogen sulfide that is added to the waste stream.

A variation of this second embodiment comprises splitting an aqueous waste stream into a first and second stream of substantially equal portions. The reduced nitrogen compounds of the first stream are oxidized into oxidized nitrogen compounds such as nitric acid or nitrate or nitrite salts. Several strong oxidizers, including but not limited to hydrogen peroxide, hydroxyl radical, potassium permanganate, can perform this oxidation. For instance, the oxidation of ammonia to nitric acid can be performed with hydrogen peroxide at a temperature between 90° C. and 150° C. Finally, the oxidized first stream and the untreated second stream are combined thereby balancing the oxidized and reduced forms of nitrogen compounds. It is recognized that multiple variations may be used without departing from the scope of the invention depending on the order of the steps of heating to 350° C., splitting the waste stream, and heating or cooling 1 stream to between 90° C. and 150° C.

A third embodiment of the present invention processes streams having carbon and nitrogen containing compounds. In this embodiment, the carbon fraction is converted to carbon dioxide with wet air oxidation. Next the oxidized and reduced forms of nitrogen are balanced by adding an appropriate nitrogen containing reactant. The reactant includes but is not limited to, nitric acid or ammonia.

Simply balancing oxidized and reduced forms of nitrogen compounds in an aqueous waste stream at ambient conditions is ineffective because of the activation energy of the reactions. Therefore, such mixture must be heated to a predetermined reaction temperature from about 300° C. to 600° C. to overcome the activation energy of the reactions, and maintained under sufficient pressure to maintain the aqueous stream in an aqueous liquid or supercritical phase. It is preferred to use temperatures of about 300° C. to 350° C. to reduce the amount of energy consumed in the process and it is preferred to use pressures at or above saturated vapor conditions at the reaction temperature. Heating is accomplished by electricity, steam, radiant and/or convective flame or heat transfer oil. The aqueous stream is heated at a pressure sufficient to prevent boiling or a pressure equal to or greater than the critical pressure of water. For denitrification of $NH_4NO_3$, which is chemically one of the most difficult of reactions 1–16, the minimum reaction temperature is 350° C. Other compounds are believed to have similar or lower reaction temperatures. Higher temperatures up to 600° C. may be used to reduce the time required to complete the reactions. Heating to a temperature less than the lowest reaction temperature would be ineffective since either no reaction would occur or the reaction rate would be too slow for practical use.

The process of the invention as described in the three embodiments requires holding the heated and pressurized conditions for a predetermined time. The predetermined time is from about 1 minute to 2 hours, long enough to complete the reactions. Since the reactions are exothermic, the reacting stream can be passed through a heat exchanger to recover the heat. Nitrogen, carbon dioxide and oxygen gas products are released by cooling and/or flashing using standard gas and liquid pressure expansion valves.

The product stream can be mixed with carbon dioxide gas at ambient or elevated temperature and pressures to react with any hydroxides present and form carbonates according to either of the following equations 17 or 18.

| 17. $2MOH + CO_2$ | → | $M_2CO_3 + H_2O$, or |
|---|---|---|
| 18. $M(OH)_2 + CO_2$ | → | $MCO_3 + H_2O$ |

EXAMPLE 1

An experiment to validate that Reaction 1 takes place in aqueous conditions at temperatures at or under 350 degrees centigrade was conducted by adding 3.34 grams of ammonium nitrate to 300 ml of water and placing the solution into a one liter stirred autoclave. The autoclave was then gradually heated to 350 degrees centigrade and gas samples were taken at 50 degree temperature increments. Pressure in the autoclave was 2400 psi, sufficient to maintain the solution in an aqueous phase. Based on the gas chromatograph readings, the ammonia reacted with the nitrate at some point between 300 and 350 degrees centigrade.

The percentage of nitrogen in aqueous solution that is converted to nitrogen gas is calculated in two steps. The first step is to calculate the amount of nitrogen in the vent gas that is actually removed from the aqueous solution. The second step is to obtain the ratio of nitrogen gas removed to the amount of nitrogen originally present in the aqueous solution or convertible nitrogen then multiplying by 100 to obtain the percent of nitrogen converted which is termed the denitrification rate.

In this example, 3.34 grams of aqueous ammonium nitrate contains 1.169 grams of nitrogen. The volume of gas bled from the autoclave combined with the gas in the autoclave amounted to 6.1 liters at a nitrogen volume concentration of 15.7% which was 1.197 grams of nitrogen gas. The denitrification rate was, therefore, 102% which was essentially complete denitrification within experimental error. The gas volume was measured by passing the gas in the autoclave through a wet test meter and then adding the known volume of the autoclave. While the gas that passed through the wet test meter was at room temperature, (approximately 20 degrees centigrade), the gas remaining in the autoclave could have been warmer. This could introduce a slight error leading to a higher calculated gas volume.

EXAMPLE 2

An experiment to validate that glycine ($NH_2CH_2CO_2H$) is denitrified (Reaction 2) in aqueous conditions at temperatures at or under 350° C. was conducted according to the procedure of Example 1. Glycine in an amount of 15.8 grams (0.21 gram moles) together with nitric acid ($HNO_3$) in an amount of 49.3 milliliters of 70% concentration (0.773 gram moles) are added to 285 grams of water. Since nitric acid is in excess, the production of nitrogen gas in Reaction 2 is determined by the amount of nitrogen in 0.21 gram moles of glycine and 0.21 gram moles of nitric acid, which is 5.90 grams of nitrogen.

The volume of vent gas from the reactor was 17.7 liters and the nitrogen gas fraction was 19.8% which was 4.38 grams of nitrogen gas. The denitrification rate was, therefore, 74.2%.

EXAMPLE 3

An experiment showing that simply heating an aqueous solution of glycine does not result in significant denitrification was conducted according to the procedure of Example 1 by adding 15.8 grams of glycine to 300 grams of water. 15.8 grams (0.21 gram moles) glycine contain 2.95 grams of nitrogen. The volume of vent gas from the reactor was 4.1 liters, and the nitrogen gas fraction was 1.5% by volume which was 0.077 grams of nitrogen gas. The denitrification rate was, therefore, 2.6%.

This 2.6% denitrification of glycine achieved by heating in the absence of an oxidant (nitric acid) is much less than the 74.2% denitrification achieved in the presence of the nitric acid oxidant.

EXAMPLE 4

An experiment to validate that pyridine ($C_5H_5N$) is denitrified (Reaction 3) in aqueous conditions at temperatures at or under 350° C. was conducted according to the procedure of Example 1. Pyridine in an amount of 15.8 grams (0.20 gram moles) together with nitric acid ($HNO_3$) in an amount of 56.0 milliliters of 70% concentration (0.878 gram moles) are added to 285 grams of water. Since pyridine is in excess, the production of nitrogen gas in Reaction 3 is determined by the amount of nitrogen in 0.878 gram moles of nitric acid and 0.878/5 (0.176 gram moles) of pyridine which provides a total of 14.76 grams of nitrogen.

The volume of vent gas from the reactor was 34.0 liters and the nitrogen gas fraction was 27.1% which was 11.5 grams of nitrogen gas. The denitrification rate was, therefore, 77.9%.

EXAMPLE 5

An experiment showing that simply heating an aqueous solution of pyridine does not result in significant denitrification was conducted according to the procedure of Example 1. Pyridine in an amount of 15.8 grams was added to 285 grams of water. 15.8 grams (0.20 gram moles) of pyridine contain 2.80 grams of nitrogen. The volume of vent gas from the reactor was 7.5 liters and the nitrogen gas fraction was 1.4% by volume, which was 0.13 grams of nitrogen gas. The denitrification rate was, therefore, 4.6%.

This 4.6% denitrification of pyridine achieved by heating in the absence of an oxidant (nitric acid) is much less than the 77.9% achieved in the presence of the nitric acid oxidant.

These examples illustrate the significant denitrification of nitrogen compounds that can be achieved through balancing reduced forms of nitrogen with an oxidized form such as nitric acid and heating to a reaction temperature. However, only example 1 achieves 100% denitrification. The other examples may be limited by the carbon. Therefore, in the preferred embodiment, carbon may be removed prior to balancing and heating in order to achieve 100% denitrification.

Although there are many methods of denitrification of compounds containing nitrogen, only incineration and bacterial action have been alleged to remove nitrogen from a plurality of nitrogen compounds. The present invention sets forth a third method of denitrification from a plurality of compounds containing nitrogen. This method enjoys the advantages of fast processing, moderate temperature operation, smaller equipment, and no need for addition of a catalyst. The method can be carried out in a vessel separate from other waste conversion processes or in the same vessel as other waste conversion processes such as wet air oxidation. The products of the method are nitrogen, carbon dioxide, methane, and oxygen gas which can be released to the atmosphere, hydroxides which can be further treated, and alcohols and hydrocarbons which are separable. While a number of embodiments of the invention have been disclosed herein, it is to be understood that such embodiments are not the only methods of implementing the invention, such that the scope of the invention should be determined solely by the claims appended hereto.

I claim:

1. A method of denitrification of at least one compound containing nitrogen in an aqueous stream, comprising the steps of:
    (a) heating said aqueous stream in the absence of a denitrification catalyst to a predetermined reaction temperature from about 300° C. to 600° C. under sufficient pressure to maintain the aqueous stream in an aqueous or supercritical phase, and
    (b) releasing nitrogen in the form of nitrogen gas while leaving an aqueous product.

2. The method as recited in claim 1, further comprising the step of:
    mixing carbon dioxide with said aqueous product to form a carbonate.

3. The method as recited in claim 1, wherein said compound containing nitrogen is ammonium nitrate.

4. The method as recited in claim 1, wherein the compound containing nitrogen is selected from the group consisting of ammonium ion, amide ion, amides, amines, amino acids, ammonia, nitro derivatives, azo compounds, glycine, pyridine, nitric acid, nitrites, and nitrates.

5. A method for denitrification of at least one compound containing nitrogen in an aqueous stream, comprising the steps of:
  (a) identifying at least one compound containing nitrogen in an aqueous phase waste stream,
  (b) determining the concentration(s) of said nitrogen compound(s),
  (c) balancing oxidized and reduced form(s) of nitrogen, and
  (d) heating the balanced mixture of step (c) in the absence of a denitrification catalyst to a predetermined reaction temperature between from about 300° C. to about 600° C. under pressure sufficient to maintain the aqueous stream in a liquid or supercritical phase, thereby forming and releasing nitrogen gas while leaving an aqueous product.

6. The method as recited in claim 5, wherein balancing oxidized and reduced forms of nitrogen in step (c) comprises:
  (a) adding a compound selected from the group consisting of hydrogen, hydrogen sulfide, hydrogen peroxide, and potassium permanganate, in an amount substantially equivalent to a half mole fraction of the compound containing nitrogen, and
  (b) heating to a predetermined reaction temperature from about 90° C. to about 150° C. at a pressure sufficient to maintain an aqueous liquid or supercritical phase.

7. The method as recited in claim 5, wherein balancing oxidized and reduced forms of nitrogen in step (c) comprises:
  (a) heating to a predetermined reaction temperature from about 90° C. to about 150° C. at a pressure sufficient to maintain an aqueous liquid or supercritical phase, and
  (b) adding a compound selected from the group consisting of hydrogen, hydrogen sulfide, hydrogen peroxide, and potassium permanganate, in an amount substantially equivalent to a half mole fraction of the compound containing nitrogen.

8. The method as recited in claim 5, wherein balancing oxidized and reduced forms of nitrogen in step (c) comprises adding a compound selected from the group consisting of nitrates, nitrites, nitric acid amides, amides, nitro derivatives, azo compounds, glycine, pyridine ammonium ion, amide ion, amides, amines, and amino acids.

9. The method as recited in claim 5, further comprising the step of:
  mixing carbon dioxide with said aqueous product in step (d) to form a carbonate.

10. The method as recited in claim 5, further comprising the step of:
  lowering pH.

11. The method as recited in claim 10, wherein lowering pH comprises:
  adding a compound from the group consisting of mineral acids, carbon dioxide, and organic acids.

12. A method for denitrification of at least one compound containing nitrogen in an aqueous stream, comprising the steps of:
  (a) identifying at least one compound containing nitrogen in an aqueous stream,
  (b) determining the concentration(s) of said nitrogen compound(s),
  (c) determining oxidized and reduced state(s) of said nitrogen compound(s),
  (d) heating the aqueous stream in the absence of a denitrification catalyst to a predetermined reaction temperature between from about 300° C. to about 600° C. under pressure sufficient to maintain the aqueous stream in a liquid or supercritical phase, and
  (e) balancing oxidized and reduced form(s) of nitrogen, thereby forming and releasing nitrogen in the form of nitrogen gas while leaving an aqueous product.

13. The method as recited in claim 12, wherein balancing oxidized and reduced forms of nitrogen in step (c) comprises:
  (a) heating to a predetermined reaction temperature from about 90° C. to about 150° C. at a pressure sufficient to maintain an aqueous liquid or supercritical phase, and
  (b) adding a compound selected from the group consisting of hydrogen, hydrogen sulfide, hydrogen peroxide, and potassium permanganate, in an amount substantially equivalent to a half mole fraction of the compound containing nitrogen.

14. The method as recited in claim 12, wherein balancing oxidized and reduced forms of nitrogen in step (c) comprises adding a compound selected from the group consisting of nitrates, nitrites, nitric acid, amides, amines, nitro derivatives, azo compounds, glycine, pyridine ammonium ion, amide ion, amides, amines, and amino acids.

15. The method as recited in claim 12, further comprising the step of:
  mixing carbon dioxide with said aqueous product in step (d) to form a carbonate.

16. The method as recited in claim 12, further comprising the step of:
  lowering pH.

17. The method as recited in claim 16, wherein lowering pH comprises:
  adding a compound from the group consisting of mineral acids, carbon dioxide, and organic acids.

18. A method for denitrification of at least one first compound containing nitrogen in an aqueous stream, comprising the steps of:
  (a) mixing at least one other second compound containing nitrogen having an oxidized or reduced state opposite that of said compound(s) containing nitrogen in the aqueous stream in an amount substantially equivalent to a mole fraction of the compound(s) containing nitrogen in the aqueous stream, wherein said mole fraction is from about TKN detection limits up to a saturated solution,
  (b) heating said mixture in the absence of a denitrification catalyst to a predetermined reaction temperature from about 300° C. to about 370° C. at a pressure sufficient to maintain the aqueous stream in a liquid phase for a period of time from about one minute to about two hours, thereby releasing nitrogen gas.

19. The method as recited in claim 18, further comprising the step of:
lowering pH.

20. The method as recited in claim 19, wherein lowering pH comprises:
adding a compound from the group consisting of mineral acids, carbon dioxide, and organic acids.

21. The method as recited in claim 18, wherein said first compound containing nitrogen is glycine, and said other second compound in step (a) is nitric acid.

22. The method as recited in claim 18, wherein said first compound containing nitrogen is pyridine, and said other second compound in step (a) is nitric acid.

23. The method as recited in claim 18, wherein said first compound containing nitrogen is nitric acid, and said other second compound in step (a) is glycine.

24. The method as recited in claim 18, wherein said first compound containing nitrogen is nitric acid, and said other second compound in step (a) is pyridine.

25. The method as recited in claim 18, wherein said first compound containing nitrogen is selected from the group consisting of ammonium ion, amide ion, amides, amines, amino acids, ammonia, azo compounds, glycine, and pyridine and said other second compound in step (a) is selected from the group consisting of nitrites, nitrates and nitric acid.

26. The method as recited in claim 18, wherein said first compound containing nitrogen is selected from the group consisting of nitrates, nitrites and nitric acid and said other second compound in step (a) is selected from the group consisting of ammonium ion, amide ion, amides, amines, amino acids, ammonia, azo compounds, glycine, and pyridine.

27. The method as recited in claim 18, wherein said first compound containing nitrogen is selected from the group consisting of R-NO and nitro derivatives, and said other second compound in step (a) is selected from the group consisting of ammonia, amide ion, amines, amides, and ammonium ion.

28. The method as recited in claim 18, wherein said first compound containing nitrogen is selected from the group consisting of ammonia, amide ion, amines, amides, and ammonium ion, and said other second compound in step (a) is selected from the group consisting of R-NO and nitro derivatives.

29. A method for denitrification of at least one first compound containing nitrogen in an aqueous stream, comprising the steps of:
(a) heating the aqueous stream in the absence of a denitrification catalyst to a predetermined reaction temperature from about 300° C. to about 350° C. at a pressure sufficient to maintain the aqueous stream in a liquid or supercritical phase for a period of time from about one minute to about two hours, and
(b) mixing at least one other second compound containing nitrogen having an oxidized or reduced state opposite that of said compound(s) containing nitrogen in the aqueous stream in an amount substantially equivalent to a mole fraction of the compound(s) containing nitrogen in the aqueous stream, wherein said mole fraction is from about TKN detection limits up to a saturated solution, thereby releasing nitrogen gas.

30. The method as recited in claim 29, further comprising the step of:
lowering pH.

31. The method as recited in claim 30, wherein lowering pH comprises:
adding a compound from the group consisting of mineral acids, carbon dioxide, and organic acids.

32. The method as recited in claim 29, wherein said first compound containing nitrogen is glycine, and said other second compound in step (a) is nitric acid.

33. The method as recited in claim 29, wherein said first compound containing nitrogen is pyridine, and said other second compound in step (a) is nitric acid.

34. The method as recited in claim 29, wherein said first compound containing nitrogen is nitric acid, and said other second compound in step (a) is glycine.

35. The method as recited in claim 29, wherein said first compound containing nitrogen is nitric acid, and said other second compound in step (a) is pyridine.

36. The method as recited in claim 29, wherein said first compound containing nitrogen is selected from the group consisting of ammonium ion, amide ion, amides, amines, amino acids, ammonia, azo compounds, glycine, and pyridine and said other second compound in step (a) is selected from the group consisting of nitrites, nitrates and nitric acid.

37. The method as recited in claim 29, wherein said first compound containing nitrogen is selected from the group consisting of nitrates, nitrites and nitric acid and said other second compound in step (a) is selected from the group consisting of ammonium ion, amide ion, amides, amines, amino acids, ammonia, azo compounds, glycine, and pyridine.

38. The method as recited in claim 29, wherein said first compound containing nitrogen is selected from the group consisting of R-NO and nitro derivatives, and said other second compound in step (a) is selected from the group consisting of ammonia, amide ion, amines, amides, and ammonium ion.

39. The method as recited in claim 29, wherein said first compound containing nitrogen is selected from the group consisting of ammonia, amide ion, amines, amides, and ammonium ion, and said other second compound in step (a) is selected from the group consisting of R-NO and nitro derivatives.

40. A method for denitrification of at least one compound containing nitrogen in an aqueous waste stream, comprising the steps of:
(a) splitting an aqueous waste stream into a first stream and a second stream,
(b) adding an oxidant compound in an amount substantially equivalent to a mole fraction of said compound(s) containing nitrogen in said first stream wherein said mole fraction is from about TKN detection limits up to a saturated solution,
(c) heating the first stream to a first predetermined reaction temperature from about 90° C. to about 150° C. at a pressure sufficient to maintain said first stream in an aqueous liquid phase, thereby oxidizing said compound(s) containing nitrogen to a different and distinct compound (s) containing nitrogen,
(d) combining the first stream with the second stream, and
(e) heating the combine stream to a second predetermined reaction temperature from about 300° C. to about 370° C. at a pressure sufficient to maintain a liquid phase for a period of time from about one minute to about two hours, and reacting compound(s) containing nitrogen from the second stream with the oxidized compound(s) containing nitrogen from the first stream and releasing nitrogen gas and leaving an aqueous product.

41. The method as recited in claim 40, further comprising:
lowering pH.

42. The method as recited in claim 41, wherein lowering pH comprises:
adding a compound from the group consisting of mineral acids, carbon dioxide, and organic acids.

43. The method as recited in claim 40, wherein said compound containing nitrogen is selected from the group consisting of ammonia, amide ion, amines, amides, and ammonium ion.

44. The method as recited in claim 40, wherein said oxidant compound is selected from the group consisting of, hydrogen peroxide, hydrogen sulfide, and potassium permanganate.

45. A method for denitrification of at least one compound containing nitrogen in an aqueous waste stream, comprising the steps of:
(a) splitting an aqueous waste stream into a first stream and a second stream,
(b) heating the first stream to a first predetermined reaction temperature from about 90° C. to about 150° C. at a pressure sufficient to maintain said first stream in an aqueous liquid phase,
(c) adding an oxidant compound in an amount substantially equivalent to a mole fraction of said compound(s) containing nitrogen in said first stream wherein said mole fraction is from about TKN detection limits up to a saturated solution, thereby oxidizing said compound(s) containing nitrogen to a different and distinct compound(s) containing nitrogen,
(d) combining the first stream with the second stream, and
(e) heating the combine stream to a second predetermined reaction temperature from about 300° C. to about 370° C. at a pressure sufficient to maintain a liquid phase for a period of time from about one minute to about two hours, and reacting compound(s) containing nitrogen from the second stream with the oxidized compound(s) containing nitrogen from the first stream and releasing nitrogen gas and leaving an aqueous product.

46. The method as recited in claim 45, further comprising:
lowering pH

47. The method as recited in claim 46, wherein lowering pH comprises;
adding a compound from the group consisting of mineral acids, carbon dioxide, and organic acids.

48. The method as recited in claim 45, wherein said compound containing nitrogen is selected from the group consisting of ammonia, amide ion, amines, amides, and ammonium ion.

49. The method as recited in claim 45, wherein said oxidant compound is selected from the group consisting of, hydrogen peroxide, hydrogen sulfide, and potassium permanganate.

* * * * *